United States Patent
Kim

(10) Patent No.: US 10,699,016 B2
(45) Date of Patent: Jun. 30, 2020

(54) SECURE BOOT SEQUENCER AND SECURE BOOT DEVICE

(71) Applicant: SAMSUNG ELECTRONICS CO., LTD., Suwon-si, Gyeonggi-Do (KR)

(72) Inventor: Jin-Woo Kim, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 282 days.

(21) Appl. No.: 15/792,371

(22) Filed: Oct. 24, 2017

(65) Prior Publication Data
US 2018/0189495 A1   Jul. 5, 2018

(30) Foreign Application Priority Data
Jan. 5, 2017   (KR) .................. 10-2017-0002028

(51) Int. Cl.
| | | |
|---|---|---|
| G06F 9/4401 | (2018.01) | |
| G06F 21/57 | (2013.01) | |
| H04L 9/30 | (2006.01) | |
| H04L 9/32 | (2006.01) | |
| G06F 9/448 | (2018.01) | |
| G06F 8/61 | (2018.01) | |

(52) U.S. Cl.
CPC .......... *G06F 21/575* (2013.01); *G06F 9/4401* (2013.01); *G06F 9/4498* (2018.02); *H04L 9/30* (2013.01); *H04L 9/32* (2013.01); *H04L 9/3236* (2013.01); *H04L 9/3239* (2013.01); *H04L 9/3247* (2013.01); *G06F 8/63* (2013.01)

(58) Field of Classification Search
None
See application file for complete search history.

(56) References Cited

U.S. PATENT DOCUMENTS

| | | | |
|---|---|---|---|
| 8,046,573 B2 | 10/2011 | Dale et al. | |
| 8,443,203 B2 | 5/2013 | Park et al. | |
| 8,904,190 B2 | 12/2014 | Wong | |
| 2010/0095106 A1* | 4/2010 | Alexander | G06F 9/4408 713/2 |
| 2012/0072734 A1* | 3/2012 | Wishman | G06F 21/572 713/189 |
| 2012/0159183 A1* | 6/2012 | Adams | G06F 21/577 713/189 |

(Continued)

FOREIGN PATENT DOCUMENTS

| | | |
|---|---|---|
| KR | 1020090128672 | 12/2009 |
| KR | 101485468 | 1/2015 |

*Primary Examiner* — Paul Yen
(74) *Attorney, Agent, or Firm* — F. Chau & Associates, LLC

(57) ABSTRACT

A boot secure device that performs a secure booting operation of a semiconductor system includes an external memory interface that provides an interface with an external memory, a first internal memory that stores a boot image stored in the external memory, a second internal memory that stores a hash of a first public key, a secure accelerator that verifies the boot image using the hash of the first public key, and a secure boot sequencer that includes a plurality of states and a plurality of operation and that controls the external memory interface, the first internal memory, the second internal memory, and the secure accelerator using at least one of the plurality of operations when a state transition occurs between two of the plurality of states.

18 Claims, 7 Drawing Sheets

(56) References Cited

U.S. PATENT DOCUMENTS

| | | | |
|---|---|---|---|
| 2013/0262612 A1* | 10/2013 | Langas | G06F 3/0605 709/211 |
| 2014/0164725 A1 | 6/2014 | Jang et al. | |
| 2014/0281466 A1 | 9/2014 | Samuel et al. | |
| 2014/0304497 A1 | 10/2014 | Park | |
| 2015/0067313 A1 | 3/2015 | Zaidi et al. | |
| 2015/0074384 A1 | 3/2015 | Yajima et al. | |

* cited by examiner

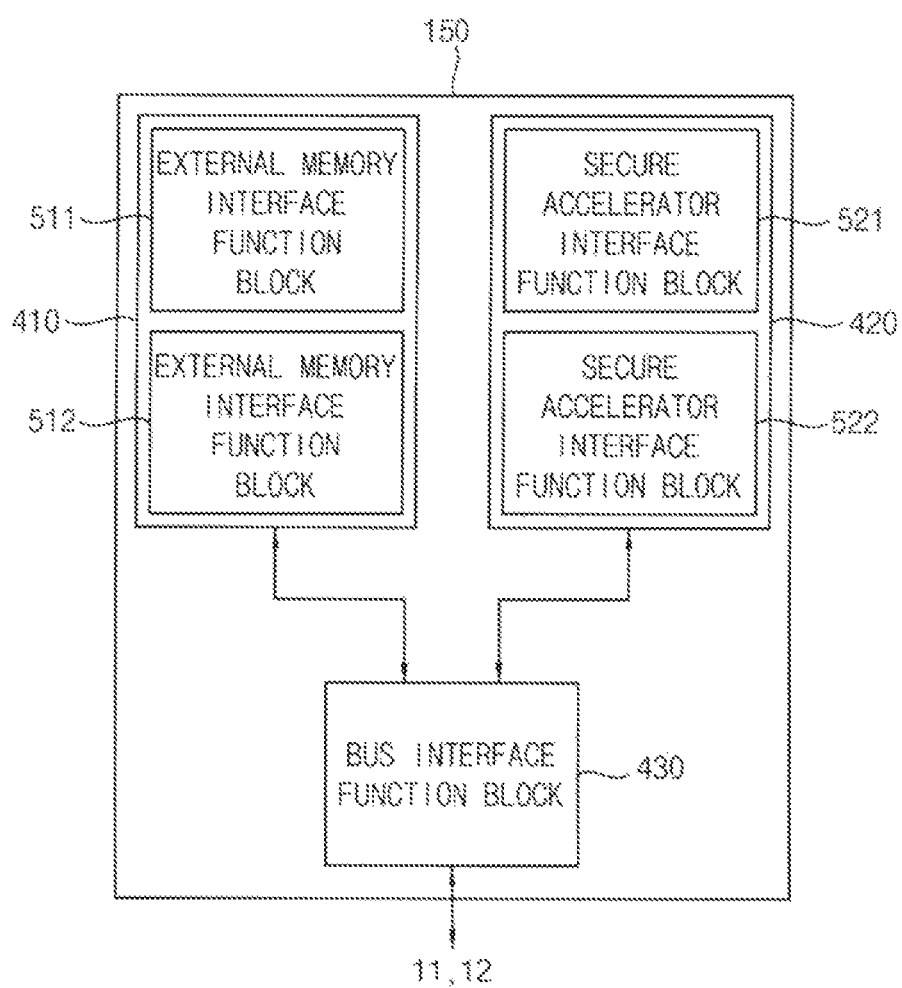

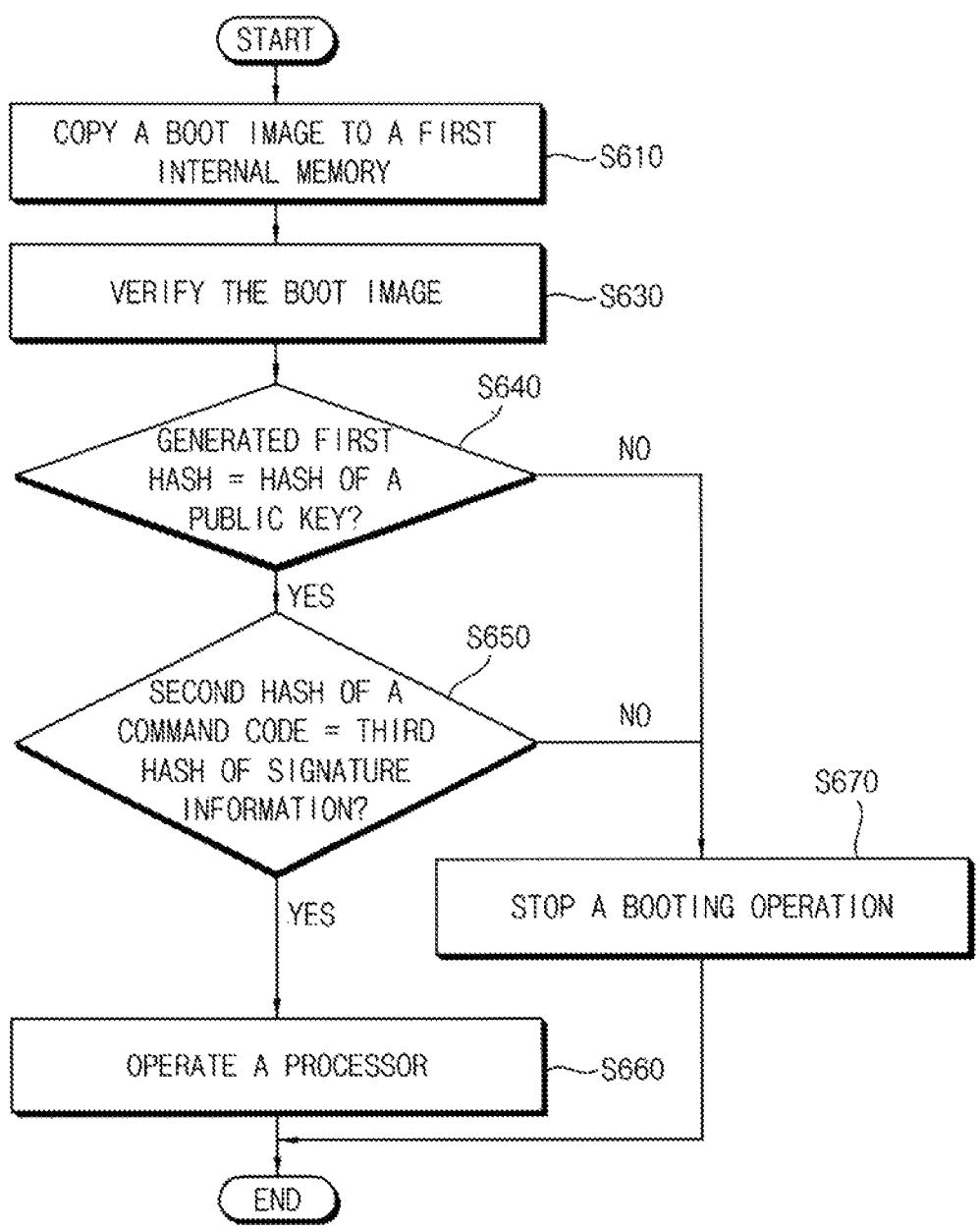

SECURE BOOT SEQUENCER AND SECURE BOOT DEVICE

CROSS-REFERENCE TO RELATED APPLICATION(S)

This application claims priority under 35 USC § 119 from, and the benefit of, Korean Patent Application No. 10-2017-0002028, filed on Jan. 5, 2017 in the Korean Intellectual Property Office (KIPO), the contents of which are herein incorporated by reference in their entirety.

BACKGROUND

1. Technical Field

Exemplary embodiments are directed to a booting device of a semiconductor system. More particularly, embodiments of the present inventive concept are directed to a secure (or, security) boot sequencer that performs secure booting of a semiconductor system and a secure boot device that includes the secure boot sequencer.

2. Discussion of the Related Art

A semiconductor system executes a boot image to initialize internal devices and perform a booting operation that loads an operating system (OS). To prevent falsification of the boot image, or execution of a non-authenticated boot image or abnormal booting due to external attacks, the semiconductor system performs a secure booting operation. For example, the semiconductor system may verify the boot image using a processor included in a system on chip (SOC) and may perform a booting, operation when the verification succeeds. Here, since the secure booting operation is performed by tasks computed by the processor, an excessive amount of computer time or security for the processor may be required. In addition, as an internet of things (IoT) technology is being developed, the use of a semiconductor system for controlling IoT devices increases. Thus, a higher security level is required for a semiconductor system because malfunction of the IoT device can result in injury or death of a user. In addition, a semiconductor system needs to be downsized to be included or inserted in a IoT device.

SUMMARY

Some exemplary embodiments provide a secure boot device that can provide a higher security level for a semiconductor system.

Some exemplary embodiments provide a secure boot sequencer that can enable or facilitate downsizing of a semiconductor system.

According to exemplary embodiments, a secure boot device include an external memory interface that provides an interface with an external memory, a first internal memory that stores a boot image stored in the external memory, a second internal memory that stores a hash of a first public key, a secure accelerator that verifies the boot image using the hash of the first public key, and a secure boot sequencer that includes a plurality of states and a plurality of operation and that controls the external memory interface, the first internal memory, the second internal memory, and the secure accelerator based on at least one of the plurality of operations when a state transition occurs between two of the plurality of states.

According to other exemplary embodiments, a secure boot sequencer is connected to an external memory interface and a secure accelerator via a bus. The secure boot sequencer includes an external memory interface function block that interfaces with an external memory using the external memory interface, a secure accelerator interface function block that sequentially operates the secure accelerator, and a bus interface function block that controls the external memory interface function block to interface with the secure accelerator interface function block via the bus. Each of the external memory interface function block, the secure accelerator interface function block, and the bus interface function block is implemented by a finite state machine.

According to other exemplary embodiments, a method of performing secure booting of a secure boot device includes copying a boot image from an external memory to a first internal memory of the secure boot device when power is supplied to the secure boot device or when the secure boot device is reset. The boot image includes a command code, a public key, and signature information generated by encrypting a hash value of the command code using a private key paired with the public key of the boot image. The method further includes verifying that the boot image is based on a hash of a public key stored in a second internal memory of the secure boot device, verifying integrity of the command code, and operating a processor by providing the command code of the boot image to the processor. When verification of the boot image succeeds and the integrity of the command code has been authenticated.

Therefore, a secure boot device according to exemplary embodiments can remove a security-threat to a processor by including a secure boot sequencer that is implemented by a finite state machine or hardware instead of the processor.

In addition, a secure boot sequencer according to exemplary embodiments can enable downsizing of a semiconductor system by not including a phase locked loop (PLL) that changes an operating frequency of a processor.

BRIEF DESCRIPTION OF THE DRAWINGS

FIG. 5 illustrates an example of a secure boot sequencer of FIG. 4.

FIG. 6 is a flowchart of a method of performing secure booting of a secure boot device of FIG. 1.

DETAILED DESCRIPTION OF EXEMPLARY EMBODIMENTS

Hereinafter, embodiments of the present inventive concept will be explained in detail with reference to the accompanying drawings.

Figure 1:
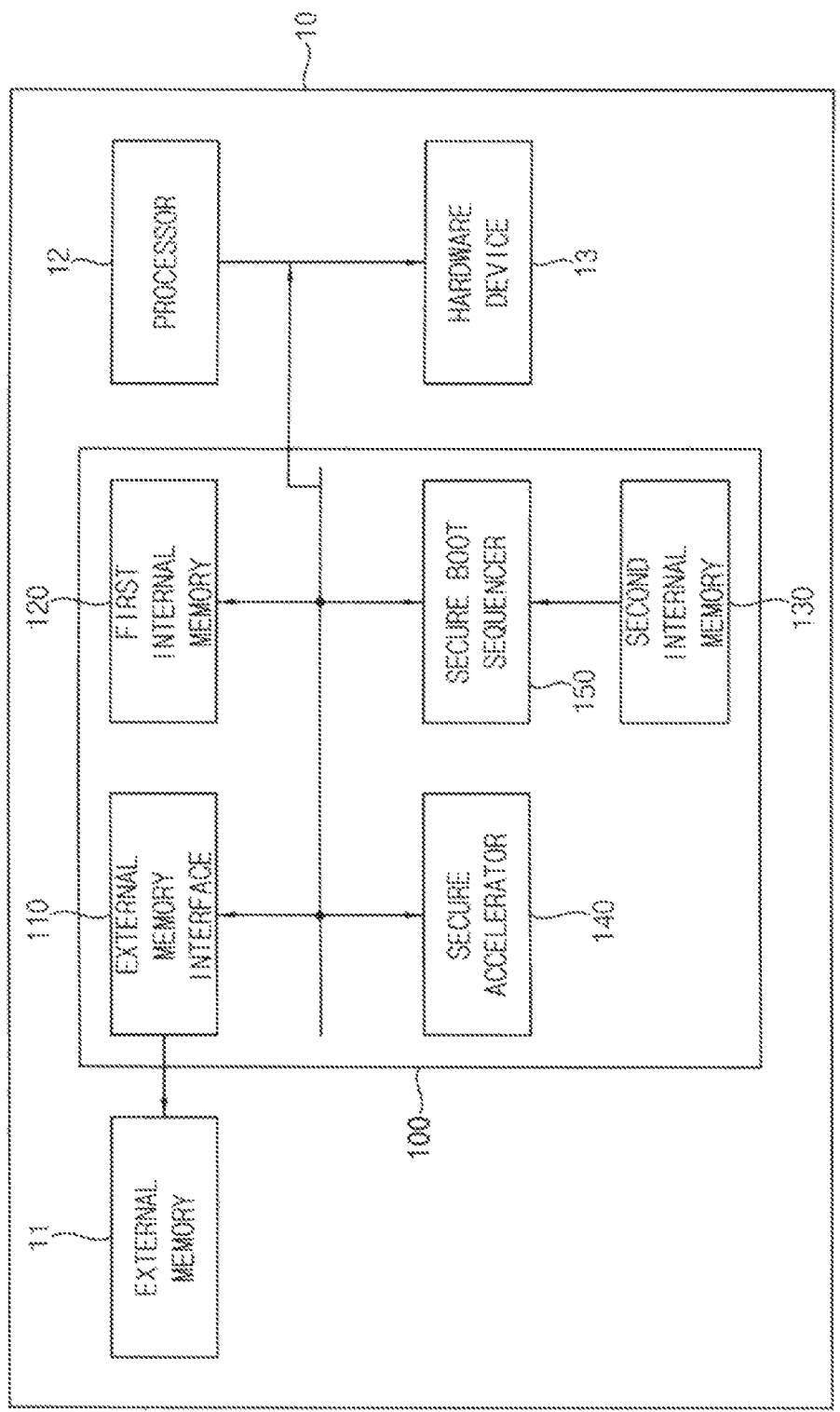
FIG. 1 is a block diagram that illustrates a secure boot device according to exemplary embodiments.
Figure 2:
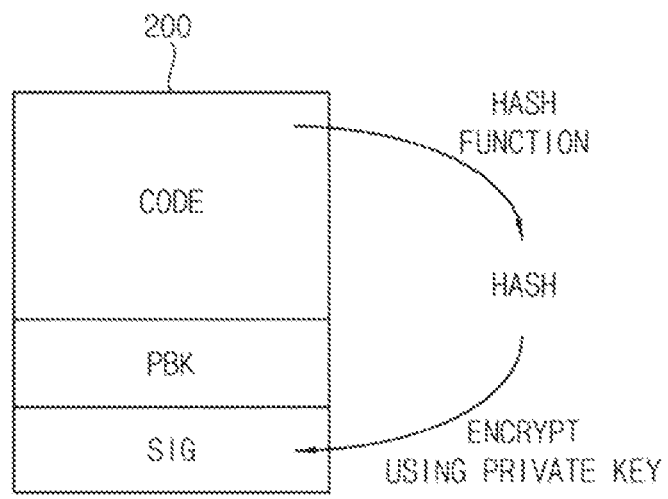
FIG. 2 illustrates an example of a boot image used in a secure boot device of FIG. 1.

FIG. 1 is a block diagram that illustrates a secure boot device according to exemplary embodiments, and FIG. 2 illustrates an example of a boot image used in a secure boot device of FIG. 1.

Referring to FIGS. 1 and 2, a semiconductor system 10 according to an embodiment includes an external memory 11, a processor 12, a hardware device 13, and a secure boot device 100.

According to an embodiment, the external memory 11 includes a boot image 200. The external memory 11 may be implemented by a NAND flash memory, an embedded multi media card (eMMC), or a universal flash storage (UPS).

According to an embodiment, the boot image 200 includes a command code CODE, a public key PBK, and signature information SIG that are required for booting of the semiconductor system 10.

The command code CODE is program that starts an operating system (OS) of the semiconductor system 10.

The public key PBK is used in an asymmetric cryptosystem. The public key PBK is paired with a private or secret key of a signature signer. The public key PBK is provided by an authentication institution.

The signature information SIG is a value that is generated by encrypting a value, which is generated by hashing the command code CODE using the private key of the signer.

According to an embodiment, the secure boot device 100 verifies the boot image 200 to perform secure booting of the semiconductor system 10. For example, the secure boot device 100 may verify the signature information SIG, or, the integrity of the command code CODE, using the public key PBK included in the boot image 200.

According to an embodiment, the secure boot device 100 includes an external memory interface 110, a first internal memory 120, a second internal memory 130, a secure accelerator 140, and a secure boot sequencer or hardware 150. The external memory interface 110, the first internal memory 120, the secure accelerator 140, and the secure boot sequencer 150 can be connected to each other via a bus. The second internal memory 130 is connected to the bus through the secure boot sequencer 150.

The external memory interface 110 provides an interface between the bus and the external memory 11.

According to an embodiment, the first internal memory 120 stores the boot image 200 that is provided from the external memory 11 using the external memory interface 110 and the bus. The first internal memory 120 can be implemented by a random access memory such as a static random access memory (SRAM), an embedded dynamic random access memory (eDRAM), etc.

According to an embodiment, the second internal memory 130 stores a hash of the public key PBK that is used to verify the public key PBK. Here, the hash of the public key PBK is a value that is generated by hashing the public key PBK. The hash of the public key PBK may also be generated using an encryption/hash algorithm such as an advanced encryption standard (AES), a secure hash algorithm (SHA), a secure hash standard (SHS), etc. The hash of the public key PBK is stored in the second internal memory 130 when the secure boot device 100 is manufactured. Since the second internal memory 130 stores the hash of the public key PBK instead of the public key PBK itself, a size of the second internal memory 130 can be smaller than a size of a memory that stores the public key PBK.

According to an embodiment, the second internal memory 130 may be implemented by an one-time programmable (OTP) memory, a mask read-only memory (ROM), a programmable read-only memory (PROM), an erasable programmable read-only memory (EPROM), an electrically erasable programmable memory (EEPROM), a flash memory, etc.

According to an embodiment, the secure accelerator 140 is implemented by a hardware device to perform a security operation. The secure accelerator 140 performs a hashing operation on the public key PBK, a hashing operation on the command code CODE, a deciphering operation on the signature information SIG using the public key PBK, etc. The secure accelerator 140 may implement at least one of a 128 bit/192 bit/256 bit AES, SHA-1/-2 (i.e., secure hash algorithm), a Rivest, Shamir and Adleman (RSA) encryption method, an Elliptic Curve Cryptography (ECC) operation, a Data Encryption Standard (DES), a 3DES, a Rivest Cipher 4 (RC4), 1024 bit/2048 bit/3072 bit modular exponentiation, and similar security algorithms. In some exemplary embodiments, the secure accelerator 140 is implemented by a combination of accelerators, each implementing a listed algorithm, such as an RSA accelerator, an SHA accelerator, a public key accelerator (PKA), etc.

According to an embodiment, the secure boot sequencer 150 controls the external memory interface 110, the first internal memory 120, the second internal memory 130, and the secure accelerator 140. A sequencer is a device that starts a next operation based on a signal indicating that a previous operation has completed. The secure boot sequencer 150 sequentially outputs commands to the external memory interface 110, the first internal memory 120, the second internal memory 130, and the secure accelerator 140 according to a predetermined secure boot sequence. For example, the secure boot sequencer 150 may include a plurality of states and a plurality of operations. The secure boot sequencer 150 controls the external memory interface 110, the first internal memory 120, the second internal memory 130, and the secure accelerator 140 based on one of the plurality of operations when a state transition occurs among the plurality of states.

In exemplary embodiments, the secure boot sequencer 150 is implemented by a finite state machine. For example, a finite state machine has a finite number of possible states. For another example, a finite state machine may be a device that has a predefined finite number of states and predefined state transition functions that performs state transitions when input symbols are received in respective states. The secure boot sequencer 150 may be implemented using programmable logic devices, programmable logic controllers, logic circuits, flip-flops, etc. The secure boot sequencer 150 can be implemented by a semiconductor device. In other words, the functionally of the secure boot sequencer 150 may be hardwired. The secure boot sequencer 150 outputs commands while performing state transitions based on the predetermined secure boot sequence.

According to an embodiment, the secure boot device 100 performs the secure booting operation using the processor 12 instead of the secure boot sequencer 150 and the secure accelerator 140. However, if the processor operates based on a reference clock having a general reference frequency, such as 26 MHz, an excessive secure booting time may be required. Here, the secure booting time can be reduced if a phase locked loop (PLL) that changes the reference frequency is used. For example, the phase locked loop may change the reference frequency to 300 MHz. In this case, however, the phase locked loop may increase the size of the secure boot device 100 because the phase locked loop is implemented by analog devices.

Thus, the secure boot device 100 according to an embodiment can remove a security-threat to the processor and enable downsizing of the semiconductor system 10 that includes the secure boot device 100 by including the secure boot sequencer 150 that is implemented by a finite state machine instead of a processor.

Figure 3:
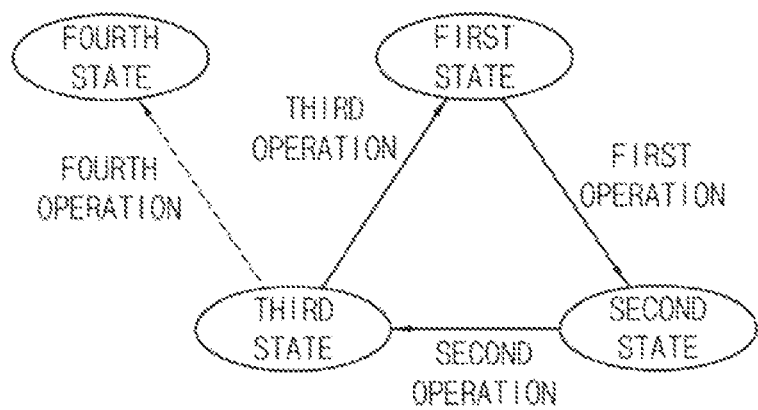
FIG. 3 illustrates an example of an operation of a secure boot sequencer included in a secure boot device of FIG. 1.

FIG. 3 illustrates an example of an operation of a secure boot sequencer included in a secure boot device of FIG. 1.

Referring to FIG. 3, according to an embodiment, the secure boot sequencer 150 implemented by a finite state machine includes a first state, a second state, a third state, and a fourth state. In addition, the secure boot sequencer 150 further includes a first operation between the first state and the second state, a second operation between the second state and the third state, a third operation between the third state and the first state, and a fourth operation between the third state and the fourth state.

For example, the secure boot sequencer 150 is in the first state when no power is supplied to the semiconductor system 10. When power is supplied to the semiconductor system 10, the secure boot sequencer 150 performs the first operation, in which a copy command for the boot image 200 of the external memory 11 is output to the first internal memory 120 based on a power supply signal. Here, the state of the secure boot sequencer 150 changes from the first state to the second state.

According to an embodiment, when the copy operation is completed in the first internal memory 120, the secure boot sequencer 150 performs the second operation, in which a read command for the boot image 200 is output to the first internal memory 120, a read command for hashing the public key PBK is output to the second internal memory 130, and a verification command for the boot image 200 is output to the secure accelerator 140. Here, the state of the secure boot sequencer 150 changes from the second state to the third state.

Next, according to an embodiment, when a first verification result indicating that the verification has succeeded is output from the secure accelerator 140, the secure boot sequencer 150 performs the third operation, in which a command for operating the processor 12 is output. Here, the state of the secure boot sequencer 150 changes from the third state to the first state.

On the other hand, according to an embodiment, when a second verification result indicating that the verification has failed is output from the secure accelerator 140, the secure boot sequencer 150 performs the fourth operation, in which a command for stopping the processor 12 is output. Here, the state of the secure boot sequencer 150 changes from the third state to the fourth state.

Although FIG. 3 illustrates that the secure boot sequencer 150 includes four states, the secure boot sequencer 150 is not limited thereto. For example, the secure boot sequencer 150 may include five or more states, and thus may include five or more operations.

Figure 4:
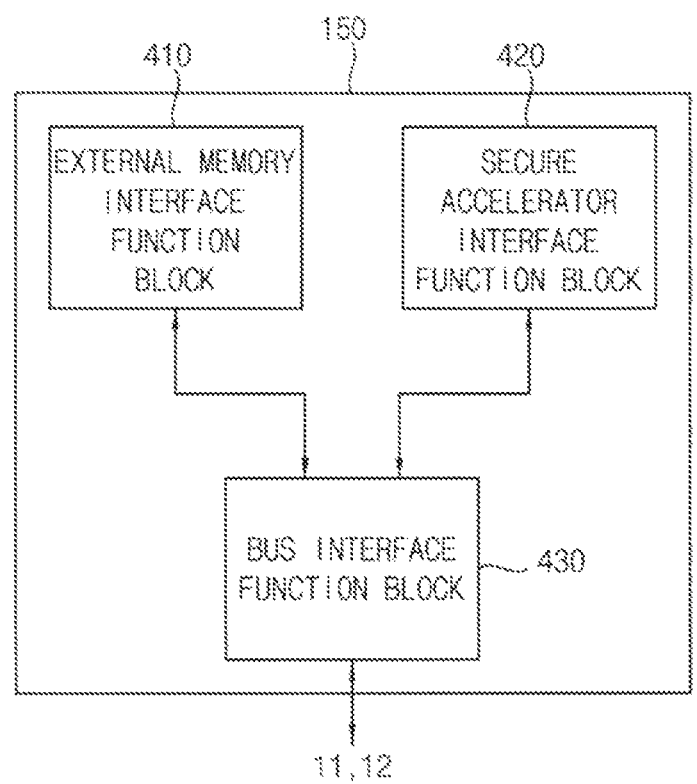
FIG. 4 illustrates an example of a secure boot sequencer included in a secure boot device of FIG. 1.

FIG. 4 illustrates an example of a secure boot sequencer included in a secure boot device of FIG. 1.

Referring to FIG. 4, according to an embodiment, the secure boot sequencer 150 includes an external memory interface function block 410, a secure accelerator interface function block 420, and a bus interface function block 430. The external memory interface function block 410, the secure accelerator interface function block 420, and the bus interface function block 430 use a predetermined common interface.

According to an embodiment, the external memory interface function block 410 includes a finite state machine that interfaces with the external memory 11 that stores the boot image 200.

According to an embodiment, the external memory interface function block 410 controls the boot image 200 to be copied from the external memory 11 to the first internal memory 120 using the bus interface function block 430.

In an exemplary embodiment, the external memory interface function block 410 includes an external memory interface that uses a memory interface such as a NAND flash interface, a serial peripheral interface (SPI) flash interface, an embedded multimedia card (eMMC) interface, etc. For example, the external memory interface function block 410 outputs a read command for the boot image 200, a write command for the boot image 200, address information for the boot image 200, etc., based on an eMMC interface.

According to an embodiment, in a design stage of the semiconductor system 10, the memory interface, such as a NAND flash interface, an SPI flash interface, an eMMC interface, etc., can be selected based on the types of the external memory 11. The external memory interface function block 410 can be implemented using the selected memory interface.

According to an embodiment, the secure accelerator interface function block 420 includes a finite state machine that sequentially operates the secure accelerator 140.

In an exemplary embodiment, the secure accelerator interface function block 420 selects at least one security algorithm, such as an RSA algorithm, an elliptic curve digital signature algorithm (ECDSA) algorithm, etc., as the secure accelerator interface. For example, the secure accelerator interface function block 420 outputs a command for the secure accelerator 140 based on an interface used in the RSA algorithm.

According to an embodiment, the bus interface function block 430 includes a finite state machine that enables the external memory interface function block 410 and the secure accelerator interface function block 420 to interface with each other via a bus.

In an exemplary embodiment, the bus interface function block 430 selects a bus interface, such as an ARM AXI 64 bit bus interface, an ARM AXI 32 bit but interface, an ARM AXI 32 bit but interface, etc., as the bus interface of the secure boot device 100.

According to an embodiment, as described with reference to FIG. 4, the secure boot sequencer 150 include the external memory interface function block 410, the secure accelerator interface function block 420, and the bus interface function block 430. That is, each function block of the secure boot sequencer 150 performs a unit function, such as an interface function with the external memory 11, an interface function with the secure accelerator 140, a bus interface function, etc. The function blocks can be easily changed, modified, or combined in the design stage of the semiconductor system 10. Thus, the secure boot sequencer 150 may respond to various design requirements of the semiconductor system 10.

FIG. 5 illustrates an example of a secure boot sequencer of FIG. 4.

Referring to FIGS. 4 and 5, according to an embodiment, the external memory interface function block 410 includes a first external memory interface function block 511 and a second external memory interface function block 512. The first external memory interface function block 511 can be implemented using a different interface from that used in the second external memory interface function block 512.

According to an embodiment, each of the first and second external memory interface function blocks 511 and 512 includes an external memory interface that uses a memory interface such as a NAND flash interface, an SPI flash interface, an eMMC interface, etc. For example, the first external memory interface function block 511 is implemented using a NAND flash interface, and the second external memory interface function block 512 is implemented using an SPI interface.

In an exemplary embodiment, the secure boot sequencer 150 or the secure boot device 100 selects one of the first and second external memory interface function blocks 511 and 512 based on a first mode setting signal. That is, one of the first and second external memory interface function blocks 511 and 512 can be selected by a mode setting. For example, in a design stage or a setting stage of the semiconductor system 10, the secure boot sequencer 150 receives the first mode setting signal from a toggle key, etc., and selects the first external memory interface function block 511 based on the first mode setting signal. Subsequently, the secure boot sequencer 150 interfaces with the external memory 11 using the first external memory interface function block 511.

Although FIG. 5 illustrates the external memory interface function block 410 as including two external memory interface function blocks or sub-function blocks, the external memory interface function block 410 is not limited thereto. For example, the external memory interface function block 410 may include three or more external memory interface function blocks by considering a size of the semiconductor system 10.

In exemplary embodiments, the secure accelerator interface function block 420 includes a first secure accelerator interface function block 521 and a second secure accelerator interface function block 522. The first secure accelerator interface function block 521 can be implemented using an interface that differs from that used in the second secure accelerator interface function block 522.

According to an embodiment, each of the first and second secure accelerator interface function blocks 521 and 522 is implemented using a security algorithm such as an RSA algorithm, an ECDSA algorithm, etc., as the secure accelerator interface. For example, the first secure accelerator interface function block 521 can be implemented using an RSA algorithm, and the second secure accelerator interface function block 522 can be implemented using an ECDSA algorithm.

In an exemplary embodiment, the secure boot sequencer 150 or the secure boot device 100 selects one of the first and second secure accelerator interface function blocks 521 and 522 based on a second mode setting signal. That is, one of the first and second secure accelerator interface function blocks 521 and 522 can be selected by a mode setting. For example, in a design or setting stage of the semiconductor system 10, the secure boot sequencer 150 receives the second mode setting signal from a toggle key, etc., and selects the first secure accelerator interface function block 521 based on the second mode setting signal. After the mode setting, the secure boot sequencer 150 sequentially operates the secure accelerator 140 using the first secure accelerator interface function block 521.

In an exemplary embodiment, the secure boot sequencer 150 uses the first and second secure accelerator interface function blocks 521 and 522. For example, the secure accelerator 140 is implemented by a combination of an RSA accelerator, an SHA accelerator, the public key accelerator (PKA), etc. In this case, the secure boot sequencer 150 operates the RSA accelerator using the first secure accelerator interface function block 521 and operates the SHA accelerator using the second secure accelerator interface function block 522.

Although FIG. 5 illustrates that the secure accelerator interface function block 420 includes two secure accelerator interface function blocks or sub-function blocks, the secure accelerator interface function block 420 is not limited thereto. For example, the secure accelerator interface function block 420 may include three or more secure accelerator interface function blocks.

In exemplary embodiments, the bus interface function block 430 is substantially the same as the bus interface function block 430 that is described with reference to FIG. 4. Thus, a duplicated description thereof will not be repeated.

According to an embodiment, since a bus interface used for the secure boot device 100, the processor 12, and the hardware device 13 is selected in the design stage of the semiconductor system 10, the bus interface function block 430 can be implemented using one bus interface.

According to an embodiment, as described with reference to FIG. 5, the secure boot sequencer 150 includes a plurality of external memory interface function blocks 511 and 512 and a plurality of secure accelerator interface function blocks 521 and 522. In the design or setting stage of the semiconductor system 10, the secure boot sequencer 150 selects at least one of the function blocks. In other words, the function blocks can be easily changed, modified, or combined in the design or setting stage of the semiconductor system 10. Thus, the secure boot sequencer 150 can satisfy various requirements for a design of the semiconductor system 10.

FIG. 6 is a flowchart of a method of performing secure booting of a secure boot device of FIG. 1.

Referring to FIGS. 1, 4, and 6, the external memory interface function block 410 copies the boot image 200 from the external memory 11 to the first internal memory 120 using the bus interface function block 430 (S610) when power is supplied to the semiconductor system 10 or when the semiconductor system 10 is reset.

According to an embodiment, when the boot image 200 is completely copied to the first internal memory 120, the secure accelerator interface function block 420 operates the secure accelerator 140 using the bus interface function block 430. In this case, the secure accelerator 140 verifies the boot image 200 based on the hash of the public key PBK stored in the second internal memory 130 (S630).

In an exemplary embodiment, the secure accelerator interface function block 420 controls the secure accelerator 140 to verify the public key PBK using the bus interface function block 430. In this case, the secure accelerator 140 obtains a first hash by hashing the public key PBK of the boot image 200 and compares the first hash with the hash of the public key PBK stored in the second internal memory 130 (S640).

According to an embodiment, when a hash value of the public key PBK stored in the second internal memory 130 is equal to the first hash value, the secure boot device 100 determines that the public key PBK is identical to the public key PBK provided by the authentication institution. That is, integrity of the public key PBK has been authenticated.

In an exemplary embodiment, when verification of the public key PBK succeeds, the secure accelerator interface function block 420 controls the secure accelerator 140 to verify the signature information SIG using the bus interface function block 430. In this case, the secure accelerator 140 generates a second hash by hashing the command code CODE of the boot image 200, generates a third hash by deciphering the signature information SIG using the public key PBK, and compares the second hash with the third hash (S650). Here, the command code CODE is a command for the processor 12 that is independent of the secure boot device 100. Thus, the command code CODE does not affect operations of the secure boot device 100.

According to an embodiment, when the second hash value is equal to the third hash value, the secure boot device 100 determines that the command code CODE is a command code generated by a signature signer. That is, the integrity of the command code CODE has been authenticated.

According to an embodiment, when the verification of the boot image 200 succeeds, the secure boot device 100 operates the processor 12 (S660) by providing the command code CODE of the boot image 200 to the processor 12 using the bus interface function block 430. For example, when verification of the signature information SIG succeeds, the secure boot device 100 operates the processor 12 by providing the command code CODE of the boot image 200 to the processor 12 using the bus interface function block 430. In this case, the processor 12 performs the booting operation and operates the hardware device 13, such as a modem, etc. In addition, the secure boot device 100 blocks or disconnects the bus interface between the secure boot device 100 and the processor 12 using the bus interface function block 430. In this case, an external access to the semiconductor system 10 can be denied.

In exemplary embodiments, when the verification of the boot image 200 fails, or when the verification of the public key PBK or the verification of the signature information SIG fails, the secure boot device 100 stops the secure booting operation (S670) and stops the operation of the processor 12 using the bus interface function block 430. For example, when verification of the public key PBK or the signature information SIG fails, the secure boot device 100 stops the booting operation and can stop operation of the processor 12 using the bus interface function block 430. In addition, the secure boot device 100 erases the boot image 200 stored in the first internal memory 120 and reinitializes the semiconductor system 10.

As described above, according to an embodiment, the secure boot device 100 verifies the integrity of the boot image 200, controls the semiconductor system 10 to perform the booting operation when the integrity of the boot image 200 is authenticated, and stops the booting operation when the integrity of the boot image 200 is not authenticated.

Figure 7A:
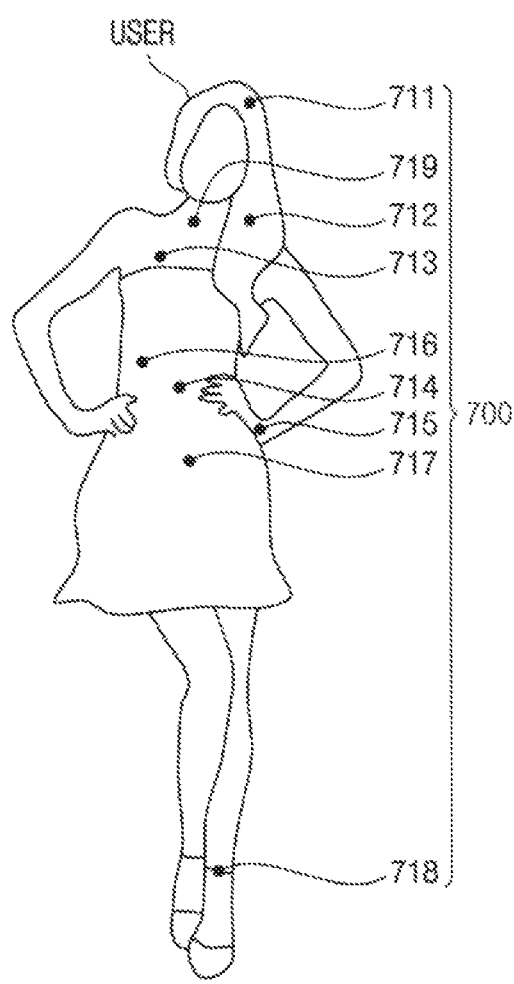
FIGS. 7A and 7B illustrate examples of an electronic device which can incorporate a secure boot device of FIG. 1.
Figure 7B:
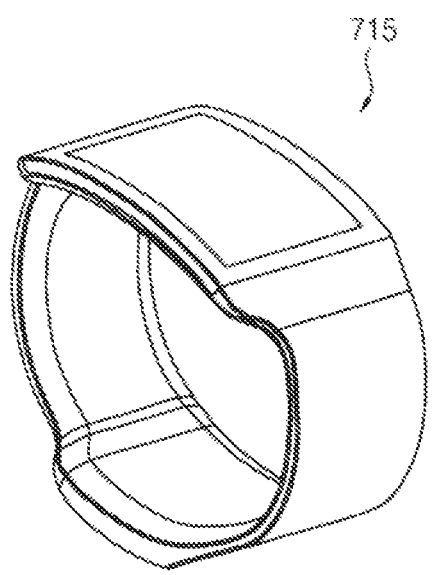

FIGS. 7A and 7B illustrate examples of electronic devices that incorporate a secure boot device of FIG. 1.

Referring to FIGS. 1, 7A, and 7B, an electronic device 700 may include the secure boot device 100. The electronic device 700 may be implemented as a wearable device, such as a wearable IoT device.

According to an embodiment, as illustrated in FIG. 7A, the electronic device 700 may be implemented as smart glasses 711, earphones 712, an electrocardiogram (ECG) and photoplethysmogram (PPG) measuring instrument 713, a belt 714, a watch 715, a blood glucose measuring instrument 716, temperature adjustable clothes 717, shoes 718, a necklace 719, etc. The electronic device 700 may include at least one sensor that senses a physical condition of a user USER, the user USER's surrounding environment, etc.

According to an embodiment, as illustrated in FIG. 7B, the electronic device 700 may be implemented as the watch 715, such as a smart watch. In this case, the user USER wears the electronic device 700 on the wrist, and thus the electronic device 700 obtains, using various sensors, information relating to the physical condition of the user USER, such as iris information, fingerprint information, heartbeat information, body-temperature information, blood glucose information, etc., and information relating to the user USER's surrounding environment, such as location information, temperature information, etc.

According to an embodiment, the secure boot device 100 included in the electronic device 700 is implemented by a finite state machine instead of a processor. In addition, the secure boot device 100 included in the electronic device 700 can perform secure booting of the processor of the electronic device 700. Thus, the secure boot device 100 included in the electronic device 700 can protect the processor of the electronic device 700 from security threats and can prevent information relating to the physical condition of the user USER and the information relating to the user USER's surrounding environment from being leaked to an unauthorized observer.

Embodiments of present inventive concept can be incorporated into a secure boot sequencer that performs secure booting of a semiconductor system and a secure boot device that includes the secure boot sequencer. Thus, embodiments the present inventive concept can be incorporated into a semiconductor device or a semiconductor system that requires secure booting.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A boot secure device for performing a secure booting operation of a semiconductor system, the boot secure device comprising:
    an external memory interface that provides an interface with an external memory;
    a first internal memory that stores a boot image stored in the external memory, wherein the boot image includes a command code, a second public key, and signature information;
    a second internal memory that stores a hash of a first public key;
    a secure accelerator that verifies the boot image using the hash of the first public key, wherein the secure accelerator verifies the second public key based on the hash of the first public key, and verifies the signature information based on the second public key and the command code of the boot image when verification of the second public key succeeds; and
    a secure boot sequencer that includes a plurality of states and a plurality of operations and that controls the external memory interface, the first internal memory, the second internal memory, and the secure accelerator uses at least one of the plurality of operations when a state transition occurs between two of the plurality of states.

2. The secure boot device of claim 1, wherein the secure boot sequencer includes:
    an external memory interface function block that provides an interface with the external memory;
    a secure accelerator interface function block that sequentially operates the secure accelerator; and a bus interface function block that controls the external memory interface function block and the secure accelerator interface function block to interface with each other via a bus.

3. The secure boot device of claim 2, wherein each of the external memory interface function block, the secure accelerator interface function block, and the bus interface function block is implemented by a finite state machine.

4. The secure boot device of claim 2, wherein the external memory interface function block includes a first external memory interface function block and a second external memory interface function block, wherein the second external memory interface function block is implemented using a different interface from that of the first external memory interface function block, and
wherein the external memory interface function block selects one of the first external memory interface function block and the second external memory interface function block as a selected external memory interface function block based on a first mode setting signal, and the external memory interface function block interfaces with the external memory using the selected external memory interface function block.

5. The secure boot device of claim 2, wherein the secure accelerator interface function block includes a first secure accelerator interface function block and a second secure accelerator interface function block.

6. The secure boot device of claim 5, wherein the secure accelerator interface function block selects one of the first secure accelerator interface function block and the second secure accelerator interface function block as a selected secure accelerator interface function block based on a second mode setting signal, and the secure accelerator interface function block operates the secure accelerator using the selected secure accelerator interface function block.

7. The secure boot device of claim 5, wherein the secure accelerator includes a first secure accelerator and a second secure accelerator, and
wherein the secure accelerator interface function block operates the first secure accelerator using the first secure accelerator interface function block and operates the second secure accelerator using the second secure accelerator interface function block.

8. The secure boot device of claim 2, wherein the external memory interface function block copies the boot image from the external memory to the first internal memory using the bus interface function block when power is supplied to the semiconductor system, and
the secure accelerator interface function block operates the secure accelerator using the bus interface function block when the boot image is completely copied.

9. The secure boot device of claim 1, wherein the boot secure device stops the secure booting operation when verification of the signature information fails.

10. The secure boot device of claim 1, wherein the boot secure device provides the command code of the boot image to the semiconductor system when verification of the signature information succeeds.

11. The secure boot device of claim 10, wherein the boot secure device blocks a bus interface of the secure boot device using the bus interface function block.

12. A secure boot sequencer that is connected to an external memory interface and a secure accelerator via a bus, the secure boot sequencer comprising:
an external memory interface function block that interfaces with an external memory using the external memory interface;
a secure accelerator interface function block that sequentially operates the secure accelerator; and
a bus interface function block that controls the external memory interface function block and the secure accelerator interface function block to interface with each other via the bus,
wherein each of the external memory interface function block, the secure accelerator interface function block, and the bus interface function block is implemented by a finite state machine,
wherein the external memory interface function block copies a boot image from the external memory to a first internal memory using the bus interface function block,
wherein the boot image includes a command code, a second public key, and signature information, and
wherein the secure accelerator verifies the boot image using a hash of the first public key, verifies the second public key based on the hash of the first public key, and verifies the signature information based on the second public key and the command code of the boot image when verification of the second public key succeeds.

13. The secure boot sequencer of claim 12, wherein the external memory interface function block includes a first external memory interface function block and a second external memory interface function block, wherein the second external memory interface function block is implemented using a different interface from that of the first external memory interface function block, and
wherein the external memory interface function block selects one of the first external memory interface function block and the second external memory interface function block as a selected external memory interface function block based on a first mode setting signal, and the external memory interface function block interfaces with the external memory using the selected external memory interface function block.

14. The secure boot sequencer of claim 12, wherein the secure accelerator interface function block includes a first secure accelerator interface function block and a second secure accelerator interface function block,
wherein the secure accelerator interface function block selects one of the first secure accelerator interface function block and the second secure accelerator interface function block as a selected secure accelerator interface function block based on a second mode setting signal, and the secure accelerator interface function block operates the secure accelerator using the selected secure accelerator interface function block.

15. A method of performing secure booting of a secure boot device, comprising the steps of:
copying a boot image from an external memory to a first internal memory of the secure boot device when power is supplied to the secure boot device or when the secure boot device is reset, wherein the boot image includes a command code, a public key, and signature information generated by encrypting a hash value of the command code using a private key paired with the public key of the boot image;
verifying that the boot image is based on a hash of a public key stored in a second internal memory of the secure boot device;
verifying integrity of the command code; and
operating a processor by providing the command code of the boot image to the processor, when verification of the boot image succeeds and the integrity of the command code has been authenticated.

16. The method of claim 15, further comprising stopping an operation of the processor, when verification of the boot image fails, or when verification of the integrity of the command code fails.

17. The method of claim 15, wherein verifying that the boot image is based on a hash of a public key stored in a second internal memory of the secure boot device comprises
   obtaining a first hash by hashing the public key of the boot image and comparing the first hash with the hash of the public key stored in the second internal memory, and
   authenticating the public key, when a hash value of the public key stored in the second internal memory is equal to the first hash value.

18. The method of claim 15, wherein verifying integrity of the command code comprises:
   generating a second hash by hashing command code of the boot image;
   generating a third hash by decrypting the signature information using the public key;
   comparing the second hash with the third hash; and
   authenticating the command code, when the second hash value is equal to the third hash value.

* * * * *